United States Patent [19]
Rostoker et al.

[11] Patent Number: 5,745,865
[45] Date of Patent: Apr. 28, 1998

[54] TRAFFIC CONTROL SYSTEM UTILIZING CELLULAR TELEPHONE SYSTEM

[75] Inventors: Michael D. Rostoker, Boulder Creek; John Daane, Saratoga; Sandeep Jaggi, San Jose, all of Calif.

[73] Assignee: LSI Logic Corporation, Milpitas, Calif.

[21] Appl. No.: 580,579

[22] Filed: Dec. 29, 1995

[51] Int. Cl.[6] ............... G01S 1/02; G05D 1/00; G08G 1/07

[52] U.S. Cl. ............... 701/117; 701/300; 701/207; 701/211

[58] Field of Search ............... 364/436, 437, 364/438, 460, 444.1, 449.2, 449.5; 379/58, 59; 455/33.1; 340/995; 701/117, 118, 119, 300, 201, 208, 211

[56] References Cited

U.S. PATENT DOCUMENTS

| | | | |
|---|---|---|---|
| 4,463,339 | 7/1984 | Frick et al. | 340/906 |
| 5,131,020 | 7/1992 | Liebesny et al. | 379/59 |
| 5,155,689 | 10/1992 | Wortham | 364/460 |
| 5,177,685 | 1/1993 | Davis et al. | 364/443 |
| 5,182,555 | 1/1993 | Sumner | 340/905 |
| 5,208,756 | 5/1993 | Song | 364/449 |
| 5,345,232 | 9/1994 | Robertson | 340/905 |
| 5,402,117 | 3/1995 | Zijderhand | 340/905 |
| 5,465,289 | 11/1995 | Kennedy, Jr. | 379/59 |
| 5,594,740 | 1/1997 | Ladue | 379/59 |
| 5,602,739 | 2/1997 | Haagenstad et al. | 364/436 |
| 5,677,837 | 10/1997 | Reynolds | 701/24 |

Primary Examiner—Michael Zanelli
Attorney, Agent, or Firm—Oppenheimer Wolff & Donnelly LLP

[57] ABSTRACT

A traffic control system includes a traffic planner that communicates with a cellular telephone system to help manage the flow of traffic, especially when emergency vehicles are rushing to a destination. The cellular communication system determines the location of the emergency vehicle, and relays the location to the traffic planner. The traffic planner, in turn, controls the traffic lights to clear the traffic along the route traveled by the emergency vehicle. The cellular communication system can also determine the location of any vehicle carrying a subscriber unit and provide navigational information that helps the vehicle arrive at its destination. The navigational information includes road maps and directions.

27 Claims, 3 Drawing Sheets

TRAFFIC CONTROL SYSTEM UTILIZING CELLULAR TELEPHONE SYSTEM

BACKGROUND OF THE INVENTION

The invention relates to traffic control system. More specifically, the invention relates to traffic control systems that utilize wireless communication systems.

Life in a traffic jam can be miserable. Cars at a standstill. Horns blaring. Tempers flaring. Time being wasted. If only fewer cars were on the road.

Unfortunately, roads are becoming more congested, not less congested. Although measures have been taken to alleviate the congestion, the measures generally have been ineffective. For example, computers and monitoring devices have been employed to operate traffic lights on flexible time schedules. Monitoring devices such as inductive loops have been embedded in the traffic sites to detect vehicles that are stopped at red lights. When a vehicle is detected, the computer proceeds to change the traffic light to allow the vehicle to pass, provided that traffic is not flowing in the cross-direction. The flexible time schedule allows traffic to flow continuously on the more heavily traveled roads, preventing needless braking and stop-and-go driving, which consume energy, create noise, waste time and contribute to rear-end collisions. Although the flexible time schedules are great for late night driving, they do little to decrease congestion at rush hour.

Consequently, commuters stuck in traffic have little recourse other than listening to their radios. FM radio stations play a wide array of music, from classical to rap. AM radio stations offer many talk shows and hosts who claim to have the answers to society's maladies. These programs might be entertaining, and perhaps even informative, but they do not cut down on the time spent on the road.

Traffic reports help alleviate the congestion, but not enough. They help the commuters avoid traffic jams. Unfortunately, the traffic reports are broadcast once every twenty minutes, by which time road conditions usually have changed. All too often, the traffic reports inform the drivers of what they already know: that traffic is backed up.

For commuters, the traffic jams are annoyances. For drivers of ambulances and other emergency vehicles, however, traffic jams often make the difference between life and death. An ambulance rushing an accident victim to the hospital does not have the time to be slowed, let alone stopped, by traffic.

The ambulance could cut and weave through a traffic jam, drive on the wrong side of the road, and run red lights. If the ambulance is equipped with appropriate equipment (e.g., an infrared transmitter), it could cause a light to change from red to green so as not to run the risk of hitting cars going in a cross-direction. Yet the ambulance must be in proximity of the light, and some vehicles might not be able to pull over to the side of the road.

It is an objective of the present invention to ease the congestion of traffic.

It is another objective of the present invention to allow for safe and speedy passage of emergency vehicles on busy roads.

SUMMARY OF THE INVENTION

According to one broad aspect of the present invention, a traffic control system for a geographical area comprises at least one computer that controls traffic lights in the area, and a cellular communication system. The cellular communication system includes a plurality of base stations covering the area, a plurality of subscriber units capable of establishing RF links with the plurality of base stations, and at least one processor that processes signals transmitted by the subscriber units to determine the locations of the subscriber units and, therefore, the locations of the vehicles carrying the subscriber units. The locations are sent by the cellular communication system to the at least one computer, which processes the locations to control the traffic lights.

A processor can be resident in each base station, or a processor can form a part of a network controller. The network controller also forms a part of the cellular telephone system.

The at least one computer can use the locations of the vehicles to generate road maps and directions for the vehicles carrying the subscriber units. The at least one computer can also control the flow of traffic for designated vehicles.

According to another broad aspect of the invention, navigational information is generated by a cellular communication system comprising a plurality of base stations covering a geographical area; a plurality of subscriber units capable of establishing RF links with the plurality of base stations; and at least one processor that processes signals transmitted by the subscriber units to determine the locations of the subscriber units. The locations can be further processed to generate the navigational information for the vehicles carrying the subscriber units.

According to yet another broad aspect of the present invention, a method of assisting a vehicle to navigate through traffic comprises the steps of establishing an RF link with a cellular telephone, which is carried by a vehicle; determining an initial position of the cellular telephone; determining changes in position of the cellular telephone during the link; generating navigational information based on the position; and transmitting navigational information to the cellular telephone over the RF link.

DETAILED DESCRIPTION OF THE PREFERRED EMBODIMENT

Figure 1:
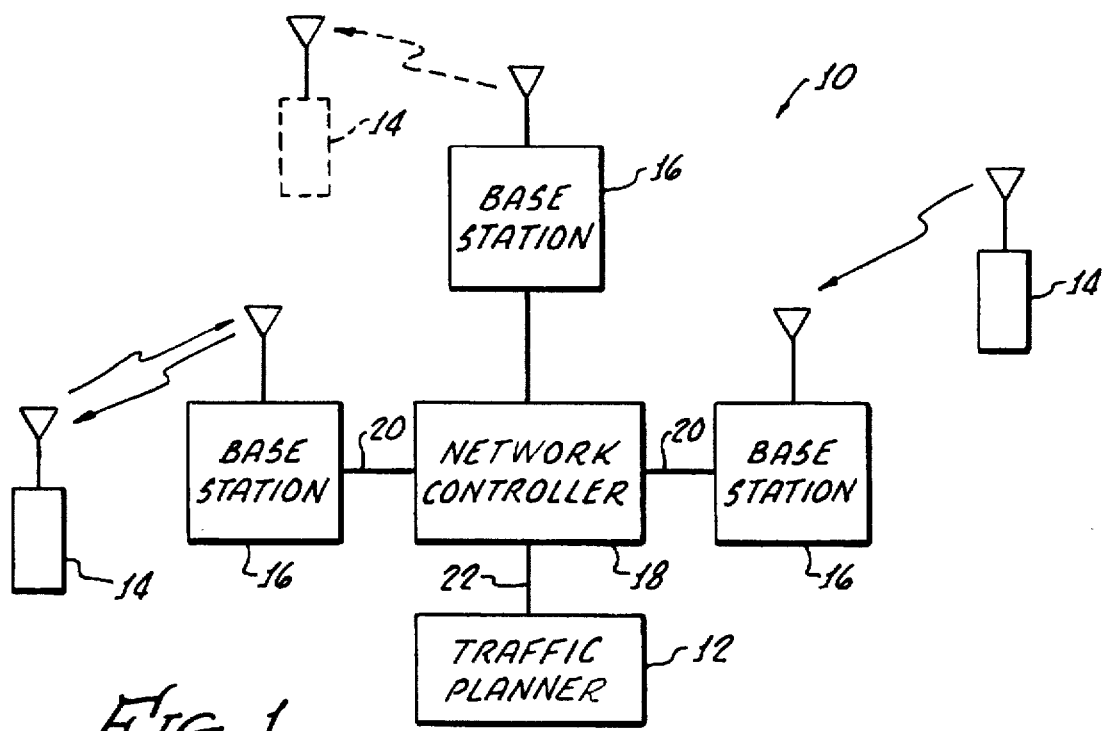
FIG. 1 is a block diagram of a traffic control system according to the present invention.

FIG. 1 shows a traffic control system 10 including a central traffic planner 12 and a cellular communications system. The cellular communication system includes a plurality of subscriber units, such as cellular telephones 14, and a number of base stations 16 that allow the cellular telephones 14 to communicate with each other. The base stations 16 cover a geographical area that is divided into a grid of cell sites, with each cell site containing at least one base station 16. Each base station 16 communicates with all cellular telephones 14 in its cell site via radio frequency ("RF") transmissions of approximately 900 kHz frequency (or any other frequency allowed by the Federal Communications Commission). A Time Division Multiple Access (TDMA) technique divides up the total RF bandwidth into a predetermined number of time slots, with each cellular telephone 14 being allocated a specific time slot. Each base station 16 continuously transmits time division multiplexed bit streams to the cellular telephones 14 on a downlink frequency, with each cellular telephone 14 responding by transmitting bursts on an uplink frequency.

The TDMA-based cellular communication system operates according to the IS-54 standard proposed by the Electronic Industry Association and the Telecommunications Industry Association. The IS-54 standard specifies that the base station 16 and a cellular telephone 14 must be able to communicate with each other in both analog and digital mode.

The base stations 16 are interlinked with a network controller 18 via a distribution facility 20 such as a dedicated copper wire or fiber optic network, radio communication link, or satellite link. Each base station 16 measures the received signal strength of each call in progress, and forwards this information to the network controller 18. The network controller 18 includes a mainframe computer that runs software for keep tracking of all calls between the cellular telephones 14 and base stations 16. The network controller 18 also uses the signal strength information from each base station 16 to determine when a call should be "handed off" from the base station in one cell site to the base station in another cell site. Hand-off allows communication to be maintained with a cellular telephone 14 as the cellular telephone 14 roams from cell site to cell site.

Valuable traffic information is communicated over a communication link 22 connecting the traffic planner 12 to the network controller 18. The link 22 could be, for example, copper wires or fiber optics, or an RF or satellite link. The traffic planner 12 includes a mainframe computer that controls all of the traffic lights for a given region, or even for an entire city. Resident in the mainframe computer are routing algorithms for receiving signals from the various roadside monitors and controlling the traffic lights.

Figure 2:
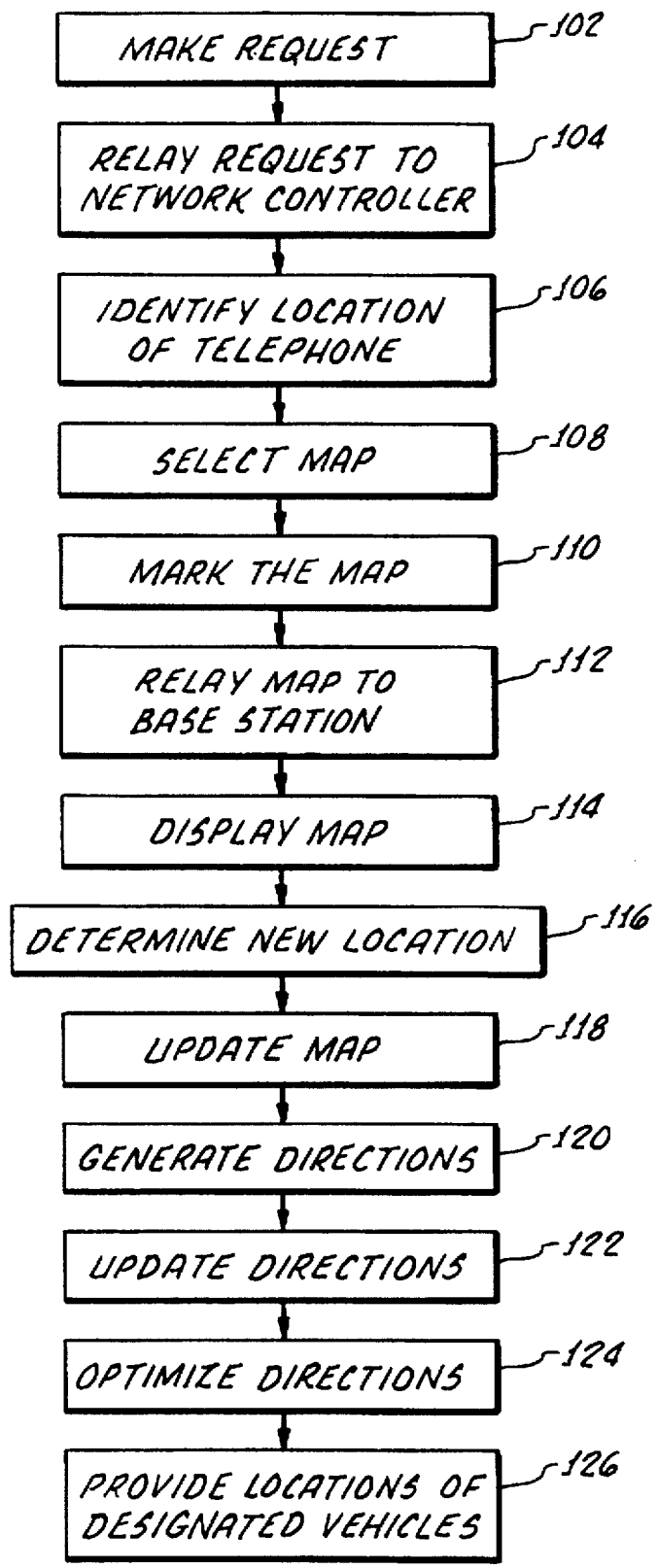
FIG. 2 is a flowchart of the operations of the traffic control system shown in FIG. 1.

Reference is additionally made to FIG. 2, which describes the operation of the system 10. The network controller 18 is programmed to provide valuable road information to any vehicle carrying a cellular telephone 14. In step 102, a driver (or passenger) gains access to this information by calling the base station 16 on the cellular telephone 14 and making a verbal request for navigational information to a specific destination. The verbal request must include the specific destination, and it should include an initial location of the vehicle. The destination and initial location could be identified by references to addresses, cross streets or landmarks.

In step 104, the base station 16 responds by relaying the request to the network controller 18. The network controller 18 converts the request to digital signals.

In step 106, the network controller 18 determines the location of the cellular telephone 14 and, therefore, the vehicle carrying the cellular telephone 14. The network controller 18 includes voice recognition software, which reduces the verbal request to Cartesian coordinates. Alternatives to the voice recognition software are available. For example, the network controller 18 can determine the absolute position of the cellular telephone 14 using well-known geolocation techniques, with reference to two, three, or more, base stations 16. Or, the network controller 18 can determine the distance of the cellular telephone 14 by measuring the round trip time for a mark signal to travel from the base station 16 to the cellular telephone 14, and back to the base station 16. Or, Cartesian coordinates can be input into the network controller 18 by a human operator.

In step 108, the network controller 18 accesses its computer memory, in which numerous road maps are stored. The network controller 18 selects a map that includes the location of the vehicle and the destination of the vehicle.

In steps 110–114, the location and destination of the vehicle are marked on the map, and the marked map is relayed to the base station 16 for transmission to the cellular telephone 14. The marked map is received by the cellular telephone 14 and displayed to the driver and/or passenger in the vehicle.

The network controller 18 is also programmed to determine the change in location of the vehicle. In steps 116 and 118, the network controller 18 determines a new location for the vehicle and updates the map to reflect the new location. The updated map is relayed to the base station 16 for transmission. The updated map is received by the cellular telephone 14, and displayed to the driver.

The network controller 18 is also programmed to generate directions that would lead the driver to find the destination. In step 120, the network controller 18 uses route planning software to generate the directions. Such software is used by GPS systems, which are now commercially available. The directions could be indicated on the map by arrows leading from the vehicle to its destination. The directions could also be provided verbally. The verbal directions are relayed from the network controller 18 to a base station 16 for transmission. The verbal directions received by the cellular telephone 14 are reproduced by a handset or speaker. In step 122, the directions are updated as the vehicle passes a landmark (e.g., turns onto a new street).

Valuable traffic information from the traffic planner 12 allows the network controller 18 to optimize the road directions. In step 124, the network controller 18 uses the information from the traffic planner 12 to generate a set of directions that allow the vehicle to avoid conditions such as traffic jams and icy roads.

Valuable information from the network controller 18 allows the traffic planner 12 to provide safe and speedy passage for designated vehicles, such as ambulances, fire engines, and police cars. In step 126, the network controller 18 informs the traffic planner 12 of the locations of the designated vehicles carrying the cellular telephones 14.

Figure 3:
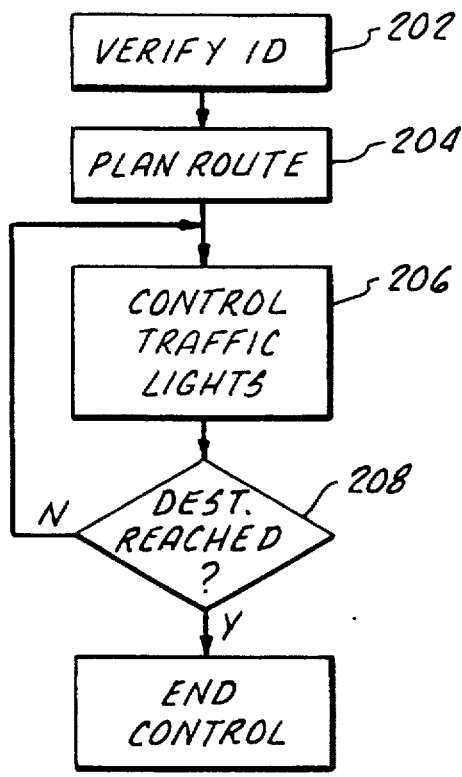
FIG. 3 is a flowchart of certain operations performed by a traffic planner, which forms a part of the traffic control system shown in FIG. 1.

Reference is now made to FIG. 3, which shows the steps that are performed by the traffic planner 12 as it processes the locations of the designated vehicles. First, the traffic planner 12 verifies the identity of the designated vehicle by examining the caller ID of cellular telephone 14 (step 202) (this step could be performed instead by the network controller 18). For each designated vehicle, the traffic planner 12 processes the locations to plan a route (step 204), and controls the traffic lights along the route to ensure that the designated vehicle encounters as little traffic as possible (step 206). The control is maintained along the route until the designated vehicle arrives at its destination (step 208). As the designated vehicle passes a light, operation of that light is returned to normal. If the designated vehicle does not follow the route, the traffic planner 12 could anticipate the traffic lights to change as the designated vehicle moves towards its destination.

In addition to controlling the lights, the traffic planner 12 sends information regarding road conditions to the network controller 18.

Figure 4:
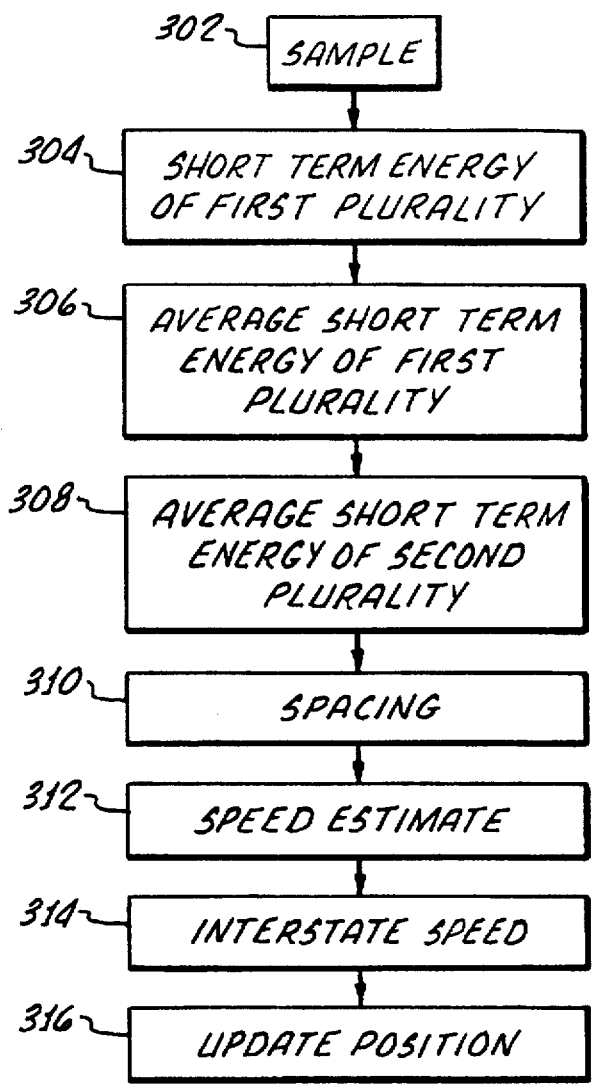
FIG. 4 is a flowchart of steps performed by the network controller to determine the location of a vehicle.

FIG. 4 shows the steps performed by the network controller 18 to determine the location of a vehicle. Vehicle speed is determined by looking at differences in power of the signal transmitted by the subscriber unit, assuming that the subscriber unit transmit a signal at a substantially constant level of power. A digitally encoded signal received by the base station 16 is sampled to produce a first sampled digital signal having a plurality of symbols (step 302). Short term energy is measured over a plurality of contiguous symbols of the first sampled digital signal symbols (step 304). The average of short term energy (hereinafter: first short term energy average) is measured over a first plurality of contiguous short term energy points (step 306). The average of short term energy (hereinafter: second short term energy average) is measured over a second plurality of contiguous short term energy points (step 308). The second plurality of contiguous short term energy points is spaced apart from the first plurality of contiguous short term energy points (step 310). Lastly the difference between the first short term energy average and the second short term energy average is determined to derive the estimated speed of the subscriber unit relative to the base station (step 312). This method is disclosed and claimed in U.S. Pat. No. 5,438,595, which is incorporated herein by reference.

Change in location of the vehicle is determined by integrating the speed over time until the speed estimate is updated (step 314). The change in location is added to the previous location to obtain a current location of the vehicle (step 316).

Figure 5:
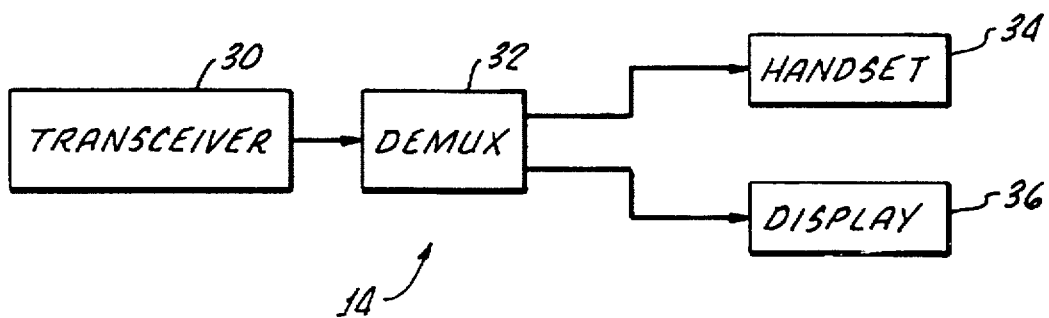
FIG. 5 is a block diagram of a cellular telephone, which also forms a part of the system shown in FIG. 1.

FIG. 5 shows a cellular telephone 14, which includes a transceiver 30, a demultiplexer 32, a handset 34 and a flat panel display 36. In a transmit mode, the transceiver 30 operates in a conventional manner. In a receive mode, the transceiver 30 receives an incoming signal, performs low noise amplification on the incoming signal, downconverts the amplified signal into an intermediate frequency (IF) signal, performs gain control on the IF signal and mixes the gain-controlled IF signal to form a baseband signal. The baseband signal is then demodulated and decoded. The decoded signal from the transceiver 30 is provided to a demultiplexer 32, which separates the audio signal from the data signal. The audio signal is sent to the handset 34, and the data signal is sent to the display 36, which can be mounted to the dashboard of the vehicle or on a surface of the telephone's housing.

Thus disclosed is a traffic control system 10 that uses a cellular communication system to generate information for helping a vehicle navigate through traffic and that uses a traffic planner to control traffic lights to allow for the safe and speedy passage of designated vehicles. Unlike GPS systems that are now commercially available, the traffic control system 10 does not require separate boxes for navigation. Instead, it uses an existing infrastructure of cellular telephones 14, bases stations 16 and network controllers 18.

It shall be understood that the embodiment described herein is merely exemplary, and that various modifications can be made without departing from the spirit and scope of the invention. For example, the navigational information could be generated by processors resident in the base stations instead of the network controller. Accordingly, the present invention is not defined solely by embodiment described herein, but by the claims that follow.

We claim:

1. A traffic control system for a geographical area, comprising:

at least one computer that controls traffic lights in the area; and a cellular communication system including a plurality of base stations covering the area, a plurality of subscriber units capable of establishing RF links with the plurality of base stations, and at least one processor that processes signals transmitted by the subscriber units to determine the locations of the subscriber units, whereby the location of a vehicle carrying a subscriber unit can be determined;

the locations being sent by the cellular communication system to the at least one computer, wherein the locations can be processed to control the traffic lights.

2. The system of claim 1, wherein a subscriber unit carried by a designated vehicle transmits a request to a base station, the request including a destination, wherein the destination is relayed to the at least one computer, and wherein the at least one computer processes the destination and location of the designated vehicle to control traffic lights along a route to the destination.

3. The traffic control system of claim 2, wherein said request further includes a caller ID, and said at least one computer verifies said caller ID.

4. The traffic control system of claim 1, wherein a processor is resident within each base station.

5. The traffic control system of claim 1, wherein the cellular communication system further includes a network controller, and wherein a processor forms a part of the network controller.

6. The system of claim 1, wherein a subscriber unit carried by a vehicle transmits a destination request to a base station, wherein the destination is relayed to the at least one processor, and wherein the at least one processor generates navigational information for the subscriber unit that transmitted the request.

7. The system of claim 6, wherein the at least one processor determines the current location of the vehicle by performing the steps of:

determining an initial location of the vehicle; determining changes in position of the vehicle; and updating the initial location for changes in position of the vehicle; and wherein the at least one processor generates the navigational information by performing the steps of:
generating a road map for the vehicle; and
marking the current location and destination of the vehicle on the road map.

8. The system of claim 7, wherein the at least one processor further performs the step of generating directions for the vehicle.

9. The system of claim 8, wherein the directions are verbal directions, the verbal directions being transmitted by a base station for reproduction over a speaker.

10. The system of claim 8, wherein the directions are marked on the road map transmitted to the subscriber unit for display.

11. The system of claim 8, wherein the at least one computer provides information concerning road conditions to the at least one processor, and wherein the at least one processor optimizes the directions in response to the road condition information.

12. The system of claim 6, wherein at least one subscriber unit includes a display for displaying the navigational information.

13. The system of claim 1, wherein the base stations and subscriber units communicate using a TDMA technique.

14. The system of claim 1, wherein the at least one processor determines the location of a vehicle by determining an initial location of the vehicle, determining changes in position of the vehicle, and updating the initial location for changes in position of the vehicle.

15. The system of claim 14, wherein the at least one processor determine the changes in position of the vehicle by analyzing the signal strength of transmissions from the subscriber unit to the base station.

16. A cellular communication system comprising:

a plurality of base stations covering a geographical area;

a plurality of subscriber units capable of establishing RF links with the plurality of base stations; and at least one processor that processes signals transmitted by the subscriber units to determine the locations of the subscriber units, and that processes the locations to generate navigational information for vehicles carrying the subscriber units;

wherein the at least one processor determines the location of a plurality of vehicles by determining initial locations of the vehicles, determining changes in positions of the vehicles, and updates the initial locations for changes in positions of the vehicles;

wherein the navigational information includes road directions for the vehicles; and wherein a traffic control computer provides information concerning road conditions to the at least one processor, and wherein the at least one processor optimizes the road directions in response to the road condition information.

17. The system of claim 16, wherein a processor is resident within each base station.

18. The system of claim 16, further including a network controller, and wherein a processor forms a part of the network controller.

19. The system of claim 16, wherein the at least one processor determines the changes in positions of the vehicles by analyzing the signal strength of transmissions from the subscriber units to the base stations.

20. The system of claim 16, wherein the navigational information includes an electronic road map, the road map indicating the location and destination of a vehicle.

21. A processor for generating navigational information obtained from a communication link between a base station and a subscriber unit, the subscriber unit being carried by a vehicle, the processor not being aboard the vehicle and being in communication with said base station, said processor comprising:

means for determining a current location of the vehicle;

means for generating a road map of an area including the vehicle;

means for marking the position of the vehicle on the road map;

wherein the processor receives from said subscriber unit a signal indicating a destination of the vehicle, and wherein the processor further comprises means for generating directions for the vehicle.

22. The processor of claim 21, wherein the at least one processor determines the changes in position of the vehicle by analyzing the signal strength of transmissions from the subscriber unit to the base station.

23. A computer for controlling traffic lights in conjunction with a cellular communication system, the communication system including a plurality of base stations covering a plurality of cells, the communication system providing locations and destinations of vehicles carrying the subscriber units, the computer comprising:

memory for storing a database of electronic road maps; and means for accessing a map of the cell in which a vehicle is located and for marking the map with the locations and destinations of the vehicles.

24. The computer of claim 23, wherein the computer also generates directions for the vehicles.

25. The computer of claim 24, wherein the computer also controls traffic lights along the directions generated for vehicles that are designated.

26. A method of assisting a vehicle to navigate on the roadways, the vehicle having a cellular telephone, the method comprising the steps of:

establishing an RF link with the cellular telephone;

determining an initial position of the cellular telephone;

determining changes in position of the cellular telephone during the RF link;

utilizing a processor to receive from said cellular telephone a signal indicating a destination for the vehicle;

it utilizing said processor to generate navigational information based on position of the cellular telephone and said destination; and transmitting the navigational information to the cellular telephone over the RF link.

27. The method of claim 26, further comprising the step of controlling traffic lights in response to the position of the cellular telephone.

* * * * *